(12) United States Patent
Horii (10) Patent No.: US 8,743,225 B2
(45) Date of Patent: Jun. 3, 2014

(54) IMAGING CONTROL SYSTEM, CONTROL APPARATUS AND METHOD FOR IMAGING APPARATUS, AND STORAGE MEDIUM

(75) Inventor: Hiroyuki Horii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 13/179,242

(22) Filed: Jul. 8, 2011

(65) Prior Publication Data

US 2012/0007999 A1 Jan. 12, 2012

(30) Foreign Application Priority Data

Jul. 12, 2010 (JP) ................................. 2010-157715

(51) Int. Cl.
H04N 5/232 (2006.01)

(52) U.S. Cl.
USPC ................. 348/211.8; 348/211.9; 348/211.99

(58) Field of Classification Search
None
See application file for complete search history.

(56) References Cited

U.S. PATENT DOCUMENTS

| | | | | |
|---|---|---|---|---|
| 5,793,367 A * | 8/1998 | Taguchi | ......................... | 715/756 |
| 5,872,922 A * | 2/1999 | Hogan et al. | ................... | 709/204 |
| 6,067,624 A * | 5/2000 | Kuno | .............................. | 726/17 |
| 6,313,875 B1 * | 11/2001 | Suga et al. | ............... | 348/211.99 |
| 6,400,401 B1 * | 6/2002 | Morino et al. | ............. | 348/211.1 |
| 6,535,793 B2 * | 3/2003 | Allard | ........................... | 700/259 |
| 6,611,285 B1 * | 8/2003 | Morita | ....................... | 348/211.3 |
| 6,750,913 B1 * | 6/2004 | Noro et al. | ............... | 348/333.02 |
| 6,977,676 B1 * | 12/2005 | Sato et al. | ................ | 348/211.11 |
| 6,977,678 B1 * | 12/2005 | Wada et al. | .............. | 348/211.99 |
| 7,057,643 B2 * | 6/2006 | Iida et al. | ................. | 348/208.14 |
| 7,236,185 B2 * | 6/2007 | Terada et al. | ............ | 348/207.11 |
| 7,464,215 B2 * | 12/2008 | Kawai | ........................... | 710/303 |
| 7,535,493 B2 * | 5/2009 | Morita | ....................... | 348/211.3 |
| 7,683,933 B2 * | 3/2010 | Tanaka | ..................... | 348/207.11 |
| 7,945,938 B2 * | 5/2011 | Takanezawa et al. | ......... | 725/105 |
| 8,363,105 B2 * | 1/2013 | Ohnishi | ........................ | 348/155 |
| 8,400,434 B2 * | 3/2013 | Oka et al. | .................. | 345/184 |
| 2002/0180878 A1 * | 12/2002 | Iida et al. | ................. | 348/333.02 |
| 2002/0191080 A1 * | 12/2002 | Terada et al. | ............. | 348/207.1 |
| 2004/0027460 A1 * | 2/2004 | Morita | ..................... | 348/211.99 |
| 2005/0027705 A1 * | 2/2005 | Sadri et al. | ........................ | 707/5 |
| 2006/0158527 A1 * | 7/2006 | Kang et al. | ............... | 348/211.99 |
| 2007/0126883 A1 * | 6/2007 | Ishige et al. | ............. | 348/211.14 |
| 2007/0171273 A1 * | 7/2007 | Saleh et al. | ................ | 348/14.08 |
| 2011/0018990 A1 * | 1/2011 | Komoto et al. | ............... | 348/116 |
| 2011/0085016 A1 * | 4/2011 | Kristiansen et al. | ....... | 348/14.03 |
| 2011/0234746 A1 * | 9/2011 | Saleh et al. | ................ | 348/14.03 |
| 2012/0057037 A1 * | 3/2012 | Ono | ........................... | 348/211.9 |

FOREIGN PATENT DOCUMENTS

| | | |
|---|---|---|
| CN | 1441386 A | 9/2003 |
| CN | 101282423 A | 10/2008 |
| JP | 2007-114503 A | 5/2007 |
| JP | 2007-201554 A | 8/2007 |
| JP | 2007-228097 A | 9/2007 |

* cited by examiner

*Primary Examiner* — Twyler Haskins
*Assistant Examiner* — Angel L Garces-Rivera
(74) *Attorney, Agent, or Firm* — Canon USA Inc IP Division (57) ABSTRACT

An imaging control system for controlling a direction of an optical axis of an imaging unit is provided. The imaging control system includes a pan change unit configured to change the direction of the optical axis to a pan direction, a tilt change unit configured to change the direction of the optical axis to a tilt direction, and a display control unit configured to display the change direction to which the direction of the optical axis is changed by the pan change unit, corresponding to the change by the tilt change unit, together with an image captured by the imaging unit.

45 Claims, 9 Drawing Sheets

IMAGING CONTROL SYSTEM, CONTROL APPARATUS AND METHOD FOR IMAGING APPARATUS, AND STORAGE MEDIUM

BACKGROUND OF THE INVENTION

1. Field of the Invention

The present invention relates to an imaging control system, a control apparatus and a control method for an imaging apparatus.

2. Description of the Related Art

Conventionally, imaging control systems having a network camera and a client apparatus for controlling the network camera have been provided. In the known imaging control systems, through operation in the client apparatus, a pan drive mechanism and a tilt drive mechanism of the network camera can be controlled. The known imaging control systems include a system capable of performing rotation operation for rotating a network camera itself or an imaging unit in the network camera about the optical axis (for example, see Japanese Patent Application Laid-Open No. 2007-114503).

However, in the network camera having the pan drive mechanism and the tilt drive mechanism, if the optical axis is changed to a tilt direction, the pan direction on the display screen is changed. The pan direction is a change direction to which the direction of the optical axis is changed if the direction of the optical axis of the network camera is changed by the pan drive mechanism. The tilt direction is a change direction to which the direction of the optical axis is changed if the direction of the optical axis of the network camera is changed by the tilt drive mechanism. In a network camera that has the pan drive mechanism or the tilt drive mechanism, and can perform the rotation operation, with the rotation operation, the pan direction or the tilt direction on a display screen for displaying a captured image is changed. In such a network camera, if the direction of the optical axis is changed to the pan direction, the movable range in the rotation on the display screen is changed. Accordingly, the user may confuse the pan direction with the tilt direction.

SUMMARY OF THE INVENTION

The present invention is directed to enabling users to operate an imaging direction of an imaging apparatus to a desired direction.

According to an aspect of the present invention, an imaging control system for controlling a direction of an optical axis of an imaging unit is provided. The imaging control system includes a pan change unit configured to change the direction of the optical axis to a pan direction, a tilt change unit configured to change the direction of the optical axis to a tilt direction, and a display control unit configured to display the change direction to which the direction of the optical axis is changed by the pan change unit, corresponding to the change by the tilt change unit, together with an image captured by the imaging unit.

According to the present invention, a user can operate an imaging direction of an imaging apparatus to a desired direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
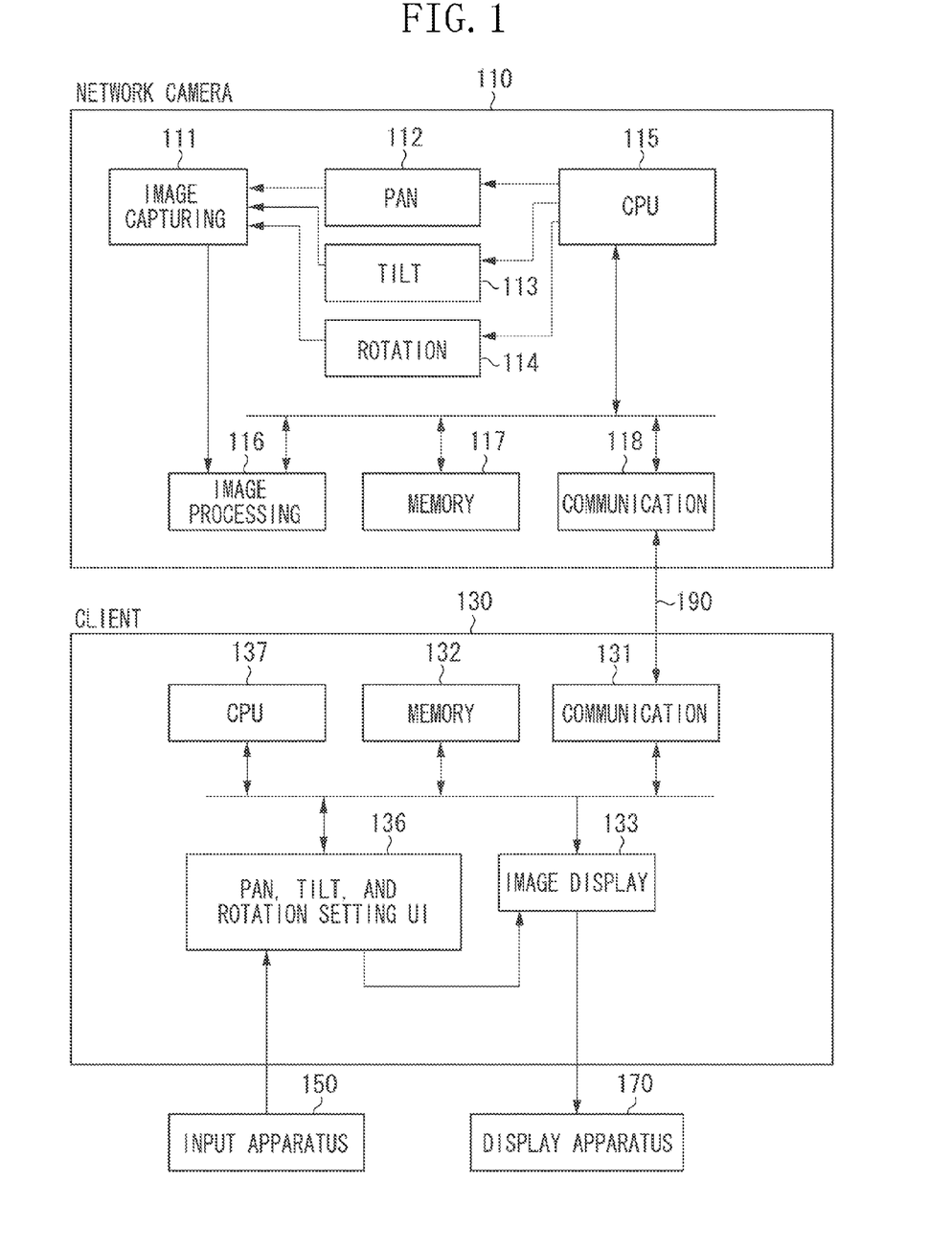
FIG. 1 is a block diagram illustrating a configuration of an imaging control system.

FIG. 1 is a block diagram illustrating a configuration of an imaging control system according to the first exemplary embodiment of the present invention. Reference numeral 110 denotes an imaging apparatus (network camera). Reference numeral 190 denotes a network such as a local area network (LAN). A client apparatus 130 serves as a control unit for controlling setting (operation) of the network camera 110, and display and recording of a captured image. To the client apparatus 130, an input apparatus 150 and a display apparatus 170 are connected.

The network camera 110 communicates with the client apparatus 130 via the network 190. Using a received command, the network camera 110 is controlled by a central processing unit (CPU) 115. A pan control unit 112, a tilt control unit 113, and a rotation control unit 114 operate each drive mechanism of pan, tilt, and rotation respectively according to an instruction of the CPU 115 to control an imaging direction of an imaging unit 111. On an image signal captured by the imaging unit 111, image signal-processing is performed by an image processing unit 116, and the processed signal is temporarily stored in a memory 117. The captured image on which the image signal-processing is performed by the image processing unit 116 is transmitted from a communication unit 118 to the client apparatus 130 via the network 190 under the control of the CPU 115.

In the exemplary embodiment, a case wherein the system includes the rotation control unit 114 is described. However, the present invention can be applied to an imaging system that does not include the rotation control unit 114, and manually performs rotation operation.

Under the control of a CPU 137, the client apparatus 130 receives the captured image transmitted from the network camera 110 by a communication unit 131, temporarily stores the image on a memory 132, transmits the image to an image display control unit 133, and displays the image on the display apparatus 170. Further, the client apparatus 130 displays a user interface such as an operation button on the display apparatus 170 by a pan, tilt, and rotation setting UI control unit 136 for controlling pan, tilt and rotation at a desired angle (position), and receives drive operation of pan, tilt, and rotation from the input apparatus 150. The instruction of pan, tilt, and rotation drive input from the input apparatus 150 is input to the pan, tilt, and rotation setting UI control unit 136. Under the control of the CPU 137, from the communication unit 131, the instruction is transmitted as a command for controlling the pan and tilt drive mechanisms and the rotation drive mechanism to the network camera 110.

Figure 2A:
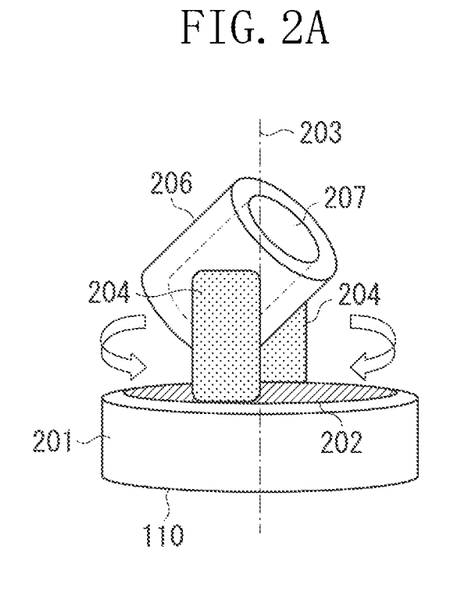
FIGS. 2A and 2B illustrate a network camera that has a pan and tilt drive mechanisms and a rotation drive mechanism.
Figure 2B:
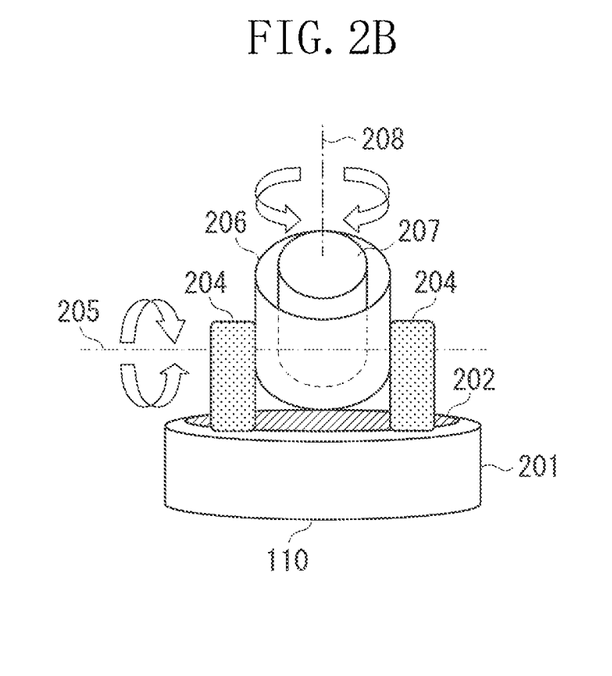

FIGS. 2A and 2B illustrate the network camera 110 that includes the pan drive mechanism, the tilt drive mechanism, and the rotation drive mechanism. FIG. 2A illustrates the camera 110 viewed from the side. The pan drive mechanism includes a bottom case 201 and a turntable 202. In the pan drive mechanism, the turntable 202 rotates about a pan rotation axis 203. FIG. 2B illustrates the camera 110 viewed from the front. The tilt drive mechanism includes lens supports 204 and a case 206. In the tilt drive mechanism, the case 206 rotates about a tilt rotation axis 205. The rotation drive mechanism includes a case 206 and an imaging unit 207. In the rotation drive mechanism, the imaging unit 207 rotates about a rotational rotation axis (optical axis) 208.

Figure 3:
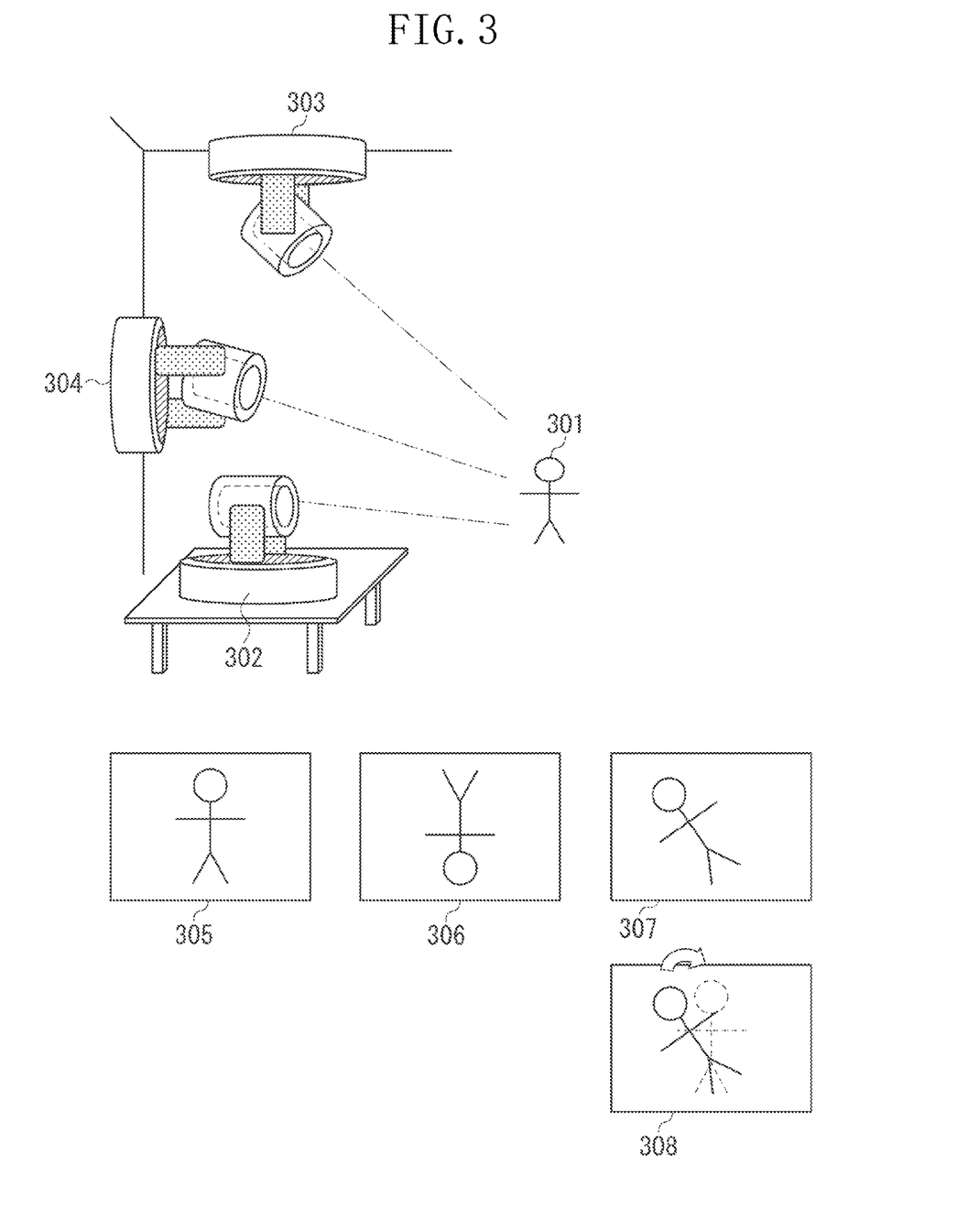
FIG. 3 illustrates installation states of the network camera.

FIG. 3 illustrates installation states (erect installation, roof-mounted installation, and wall-mounted installation) of the network camera 110. Reference numeral 302 denotes an erect installation of the network camera 110, reference numeral 303 denotes a roof-mounted installation, and reference numeral 304 denotes a wall-mounted installation. As illustrated in FIG. 3, even if the network camera 110 is installed in various positions, an imaging angle of the network camera 110 can be changed to a desired angle by the three drive mechanisms of pan, tilt, and rotation, and the object can be in an erect state.

In the erect installation 302, as illustrated in a captured image 305, the object 301 is captured in the erect state. In the roof-mounted installation 303, as illustrated in a captured image 306, the object 301 is captured in an inverted state. However, the image can be easily converted into an image of the erect state by changing the order of reading out the image signal upside down. In the wall-mounted installation 304, as illustrated in a captured image 307, the object 301 is captured in a slanting state if the image capturing direction is set to a desired direction. The object 301 that has been captured in the slanting state can be adjusted to an image of the erected state like a captured image 308 by rotation of the imaging unit 207 using the rotation drive mechanism. In such various setting states, especially in the wall-mounted installation 304, if the imaging direction is set to the desired direction as mentioned above, the image is captured in the state where the object is in the slanting state as illustrated in the image 307. To correct the slant, the rotation drive mechanism is provided.

Figure 4A:
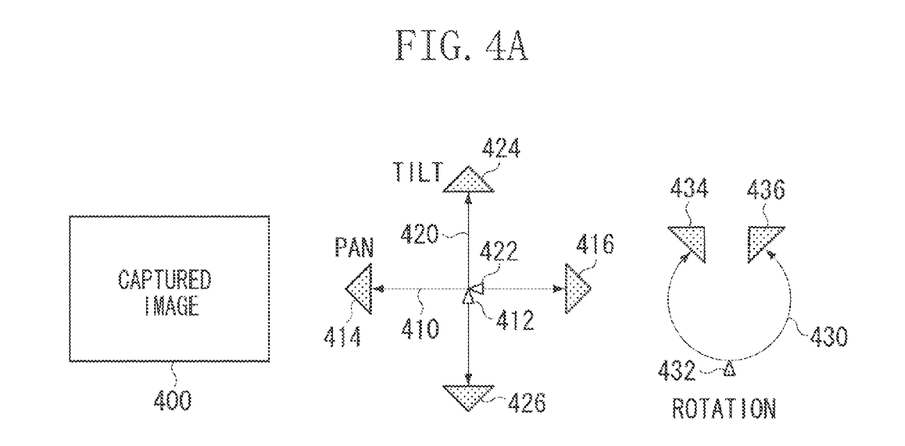
FIGS. 4A and 4B illustrate tilt and rotation setting screens displayed on a display apparatus in a client apparatus according to a first exemplary embodiment.
Figure 4B:
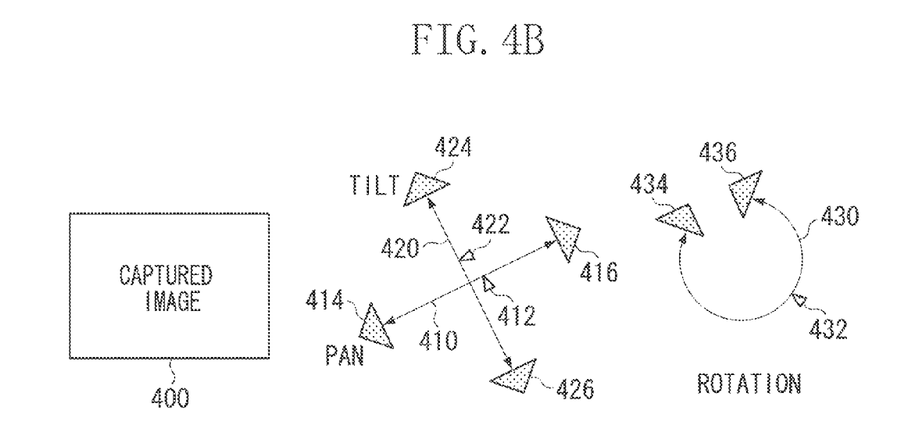

FIGS. 4A and 4B illustrate pan, tilt, and rotation setting (operation) screens to be displayed on the display apparatus 170 in the client apparatus 130. In FIG. 4A, in an area 400, a captured image received from the network camera 110 is displayed.

On the side of the area 400, a pan operation unit, a tilt operation unit, and a rotation operation unit are displayed. An arrow 410 indicates a pan direction and a movable range. The pan direction is a change direction to which the direction of the optical axis is changed if the direction of the optical axis of the network camera is changed by the pan drive mechanism. A marker 412 indicates a current position of the pan drive mechanism. An operation button 414 performs pan-drive of the direction of the optical axis to the left. An operation button 416 performs pan-drive of the direction of the optical axis to the right. An arrow 420 indicates a tilt direction and a movable range. The tilt direction is a change direction to which the direction of the optical axis is changed if the direction of the optical axis of the network camera is changed by the tilt drive mechanism. A marker 422 indicates a current position of the tilt drive mechanism. An operation button 424 performs tilt-drive of the direction of the optical axis to the upper side. An operation button 426 performs tilt-drive of the direction of the optical axis to the lower side. An arrow 430 indicates a rotation direction and a movable range. The rotation direction is a direction for rotating the network camera itself or the imaging unit in the network camera around the optical axis. In the exemplary embodiment, by the rotation drive, the imaging unit 111 rotates around the optical axis. A marker 432 indicates a current position of the rotation drive mechanism. An operation button 434 performs rotation-drive of the imaging unit 111 to the right side. An operation button 436 performs rotation-drive of the imaging unit 111 to the left side.

FIG. 4A illustrates setting screens in a case where the pan, tilt, and rotation drive mechanisms are at points of origin respectively. For example, if the operation button 414 is operated, a command is transmitted to the network camera 110 such that the direction of the optical axis is pan-driven to the left. In the network camera 110, in response to the command, the pan-drive mechanism is driven, and pan-driven to the left. In response to the movement of the pan drive mechanism, the marker 412 indicating the current position of the pan drive mechanism moves to the left, and the marker 412 is displayed. Further, an image captured while the pan drive mechanism is moved to the left is displayed on the area 400. Similarly, if the pan-drive operation to the right, the tilt-drive operation to the upper or lower side, or the rotation-drive operation to the right rotation direction or the left rotation direction is performed, a command corresponding to the operation is transmitted to the network camera 110. In the network camera 110, each drive mechanism is driven according to the command. If each drive mechanism in the network camera 110 is driven, in response to the drive of each drive mechanism, the markers indicating the current positions are moved and displayed. Further, the image captured with the movement is displayed on the area 400.

FIG. 4B is an example of the setting screen displayed when the pan and tilt drive mechanisms and the rotation drive mechanism are driven. In FIG. 4A, if the rotation is driven to the left rotation direction, in response to the drive, the captured image rotates to the left. In such a state, the change direction to which the optical axis moves when the pan drive and the tilt drive are performed, also rotates to the left. More specifically, as illustrated in FIG. 4B, the pan direction and the tilt direction change to the directions of the arrows 410 and 420 respectively. Then, on the pan, tilt, and rotation setting screens, in response to the drive of the rotation drive mechanism, the arrow 410 indicating the pan direction, and the arrow 420 indicating the tilt direction are rotated and displayed as illustrated in FIG. 4B. Along with the rotation of the arrow 410 and the arrow 420, the marker 412 and the marker 422 that indicate the current positions of the pan drive mechanism and the tilt drive mechanism, the operation button 414 and the operation button 416 for pan-driving, and the operation button 424 and the operation button 426 for tilt-driving are also displayed as illustrated in FIG. 4B.

If the optical axis is driven, for example, to the right, due to the rotation of the pan drive mechanism, an area of an angle of rotation in the rotation drive rotates together. Then, on the pan, tilt, and rotation setting screens, depending on the drive of the pan drive mechanism, the arrow 430 indicating the rotation direction and the movable range is rotated and displayed as illustrated in FIG. 4B. Along with the rotation of the arrow 430, the marker 432 indicating the current position of the rotation drive mechanism and the operation button 434 and the operation button 436 for driving the rotation are also displayed as illustrated in FIG. 4B.

Figure 5:
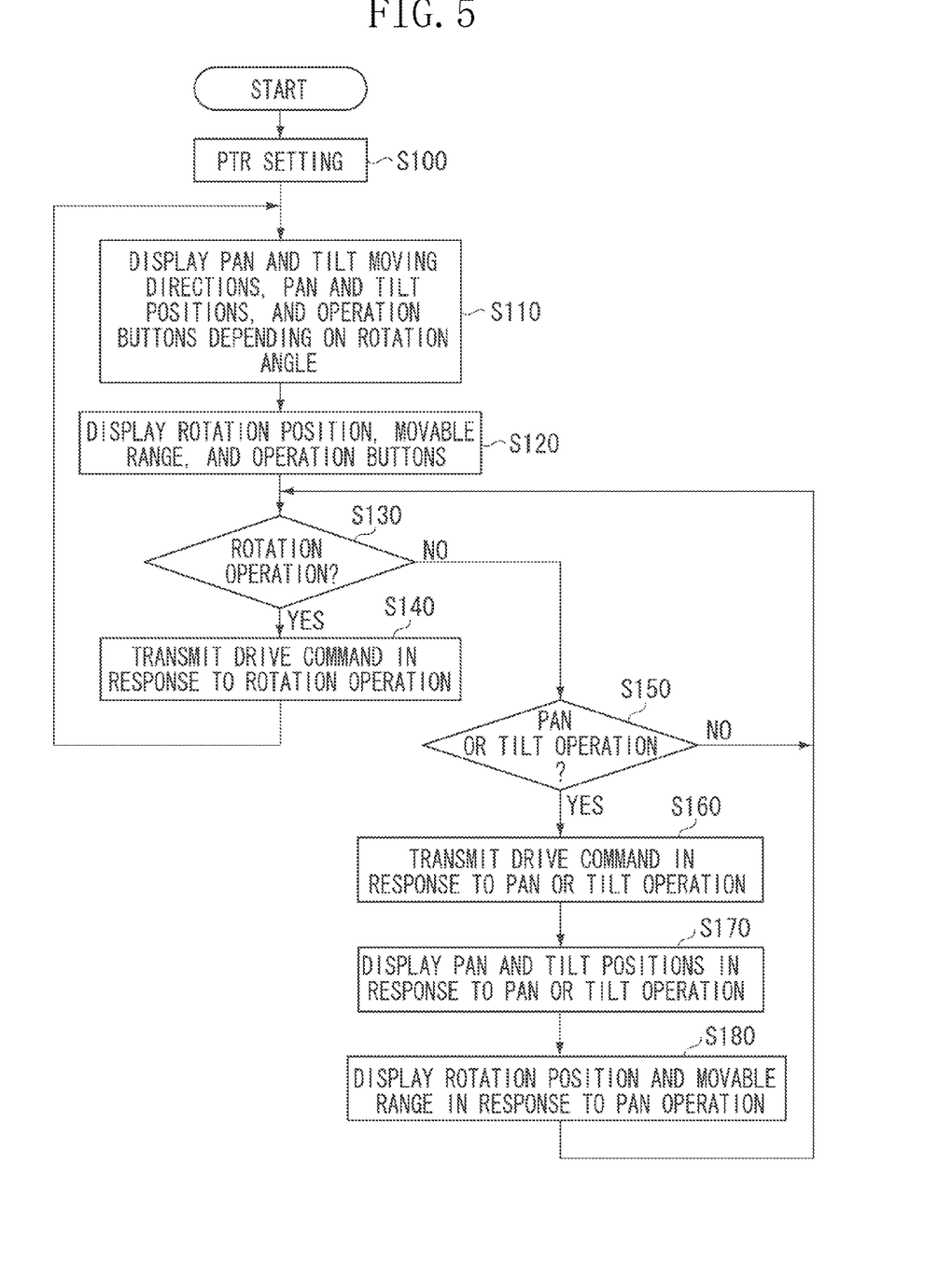
FIG. 5 is a flowchart illustrating processing to be performed by the client apparatus according to the first exemplary embodiment.

FIG. 5 is a flowchart illustrating the processing performed by the client apparatus 130. In a case where the functions of the client apparatus 130 are performed by the CPU 137 executing a program, the processing flow in FIG. 5 shows the program for instructing the CPU 137 to implement the procedure illustrated in FIG. 5. The CPU 137 executes the program read from a storage unit (not shown). The storage unit is a storage medium that records the program which the CPU 137 can read. The storage medium includes, for example, a read-only memory (ROM). The processing flow in FIG. 5 can be implemented by hardware.

In FIG. 5, in step S100, the CPU 137 enters a PTR setting mode for making a setting (operation) of each mechanism of the pan, tilt, and rotation. In the PTR setting, the CPU 137 instructs an image display control unit 133 to display the pan, tilt, and rotation setting screens as illustrated in FIG. 4, and enables instruction by commands to the network camera 110.

In step S110, the CPU 137 instructs the image display control unit 133 to display the pan direction and the tilt direction (the arrow 410, and the arrow 420), the pan position and the tilt position (the marker 412 and the marker 422), the operation buttons (the operation button 414, the operation button 416, the operation button 424, and the operation button 426) depending on the current rotation angle. In step S120, the CPU 137 instructs the image display control unit 133 to display the rotation direction and the movable range (the arrow 430) in the rotation, the rotation position (the marker 432), and the operation buttons (the operation button 434 and the operation button 436).

In step S130, the CPU 137 checks whether rotation operation is performed. In step S130, if the rotation operation is performed (YES in step S130), in step S140, the CPU 137 transmits a drive command to the network camera 110 along with the rotation operation, and then, the processing returns to step S110. More specifically, according to the driven rotation angle, in step S110, the pan direction, the tilt direction, the pan and tilt positions, and the operation buttons are displayed. In step S120, the rotation direction, the rotation position, and the operation buttons are displayed. Then, in step S130, the CPU 137 waits for user operation.

In step S130, if the rotation operation is not performed (NO in step S130), in step S150, the CPU 137 checks whether pan operation or tilt operation is performed. In step S150, if the pan operation or the tilt operation is not performed (NO in step S150), the processing returns to step S130, and the CPU 137 waits for user operation.

In step S150, if the pan operation or the tilt operation is performed (YES in step S150), in step S160, according to the pan operation or the tilt operation, the CPU 137 transmits a drive command to the network camera 110. In step S170, according to the pan operation or the tilt operation, the pan position and the tilt position are displayed. In step S180, the CPU 137 instructs the image display control unit 133 to display the rotation direction and the movable range, the rotation position, and the operation buttons according to the pan angle. In step S130, the CPU 137 waits for user operation.

Figure 6:
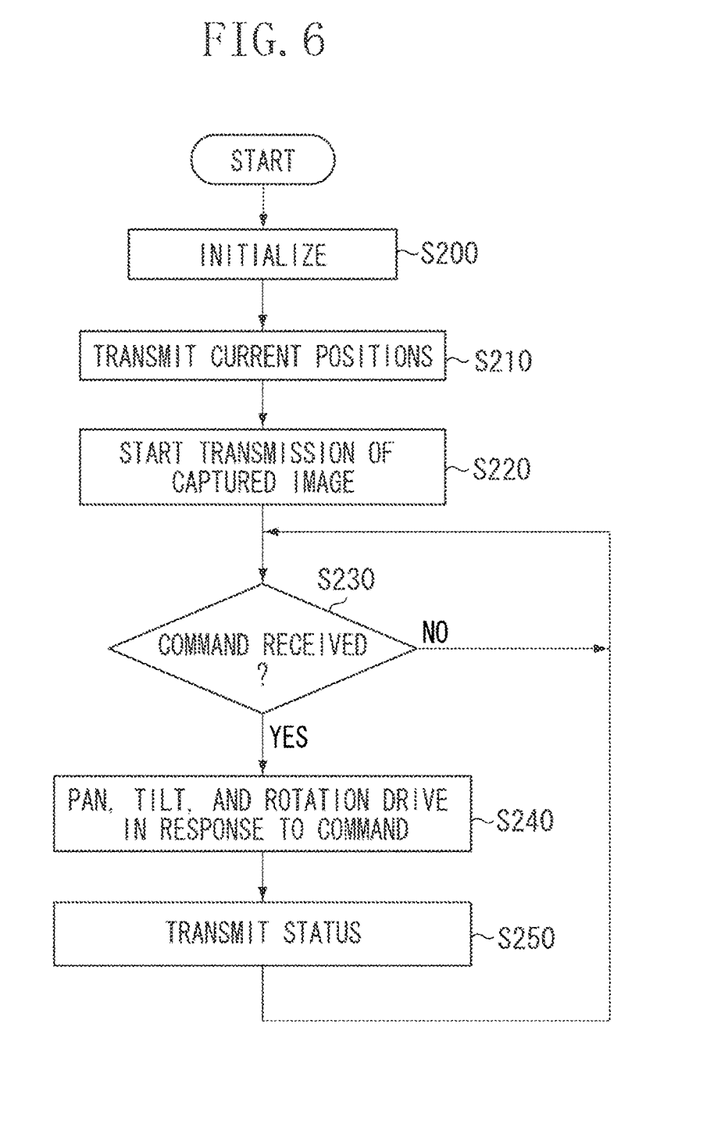
FIG. 6 is a flowchart illustrating processing to be performed by the network camera.

FIG. 6 is a flowchart illustrating the processing to be performed by the network camera 110. In a case where the functions of the network camera 110 are performed by the CPU 115 executing a program, the processing flow in FIG. 6 shows the program for instructing the CPU 115 to implement the procedure illustrated in FIG. 6. The CPU 115 executes the program read from a storage unit (not shown). The storage unit is a storage medium that records the program which the CPU 115 can read. The storage medium includes, for example, a ROM. The processing flow in FIG. 6 can be implemented by hardware.

In FIG. 6, in step S200, the CPU 115 initializes the network camera 110. The initialization includes initialization of each drive mechanism of the pan, tilt, and rotation. More specifically, origin positioning of each mechanism of the pan, tilt, and rotation, and detection of the current positions are performed. In step S210, the CPU 115 transmits information of the current positions of each mechanism of the pan, tilt, and rotation to the client apparatus 130.

In step S220, the CPU 115 starts transmission of an image captured by the imaging unit 111 to the client apparatus 130. In this state, in step S230, the network camera 110 waits for a command from the client apparatus 130. In step S240, if the command is received from the client apparatus 130, according to the command, the CPU 115 instructs each drive mechanism to execute driving in the pan, tilt, and rotation. After performing the pan drive, the tilt drive, and the rotation drive, in step S250, the CPU 115 transmits the current positions as a status. Then, the processing returns to the processing in step S230, and the CPU 115 waits for a command.

As described above, since the pan direction and the tilt direction change due to the rotation, the movement directions are clearly shown. Thus, in performing the pan operation or the tilt operation, the user can intuitively understand to which direction the captured image moves. Accordingly, the user can set the direction to a desired direction more easily and quickly. Further, by displaying the operation system for instructing the movement in the pan or the tilt, corresponding to the movement direction in the pan or the tilt, the operation of the user is closely related to the movement of the imaging screen. As a result, the user-friendly setting screen can be provided. Further, by displaying the area of the angle of rotation that can move in the rotation corresponding to the angle of pan, while the captured image is driven and moved by the pan drive mechanism, the user can understand the area of the angle of rotation. Thus, the user can understand how to adjust the rotation angle by rotating to one of the right and left directions. Accordingly, the user can adjust the rotation angle more easily.

Figure 7A:
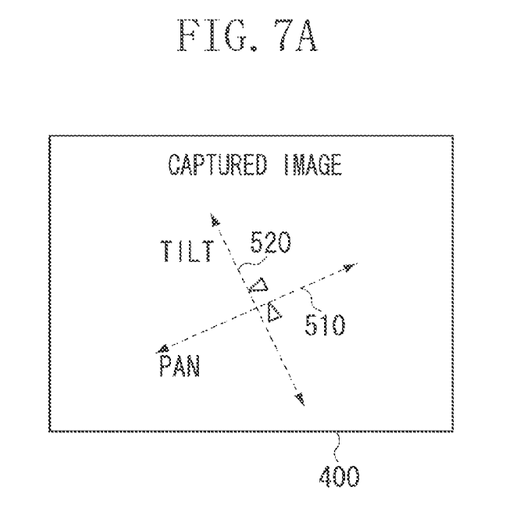
FIGS. 7A and 7B illustrate the other examples of the pan, tilt and rotation setting screens displayed on the display apparatus in the client apparatus.

The display method of the movement directions in the pan, tilt, and rotation and the operation buttons is not limited to the example illustrated in FIG. 4. For example, in an example in FIG. 7A, in the area 400 where a captured image is displayed, an arrow 510 indicating a pan operation direction and an arrow 520 indicating a tilt operation direction are superimposed on the captured image and displayed.

Figure 7B:
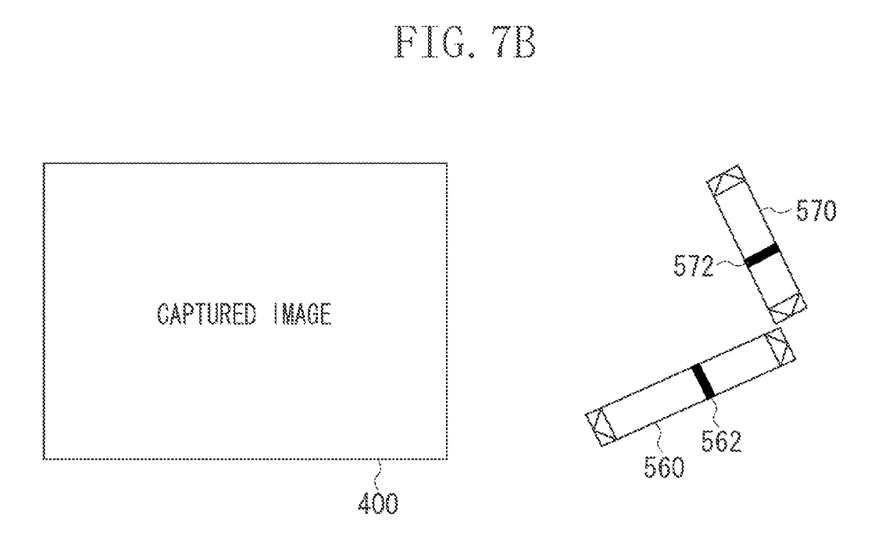

In an example in FIG. 7B, on the side of the area 400 where a captured image is displayed, a bar 560 indicating a pan direction and a movable range, and a bar 570 indicating a tilt direction and a movable range are disposed and displayed. In the bar 560 and the bar 570, a marker 562 and a marker 572 indicating a current position are displayed respectively. To both ends of the bar 560 and the bar 570, operation buttons are disposed respectively. An instruction can be given by specifying a position within the bars instead of the both ends of the bars 560 and 570.

Second Exemplary Embodiment

In the second exemplary embodiment, the network camera has at least drive mechanisms of the pan and tilt. The configuration of the camera imaging control system is similar to that in FIG. 1, and the description is omitted.

In the network camera having drive mechanisms of the pan and tilt, as illustrated in FIG. 2, the case 206 rotates around the tilt rotation axis 205. The turn table 202 rotates around the pan rotation axis 203. When a tilt angle is zero degrees (horizontal state), if the pan rotation is performed, a captured image moves in the horizontal direction. When the tilt angle is 90 degrees (vertically upward), if the pan rotation is performed, the captured image rotates around the center of the image. In other words, the movement is similar to that in the optical axis rotation When the tilt angle is within the range, in other words, within zero to 90 degrees, if the pan rotation is performed, the optical axis rotates along the side of the circular cone corresponding to the tilt angle. Then, the captured image moves showing the shape of an arc.

FIGS. 8A to 8E illustrate pan, tilt, and rotation setting (operation) screens to be displayed on the display apparatus 170 in the client apparatus 130. On the screens, pan directions corresponding to the tilt angle are indicated. As described above, the movement (moving direction) of the captured image while the pan drive mechanism is driven depends on the tilt angle. Accordingly, in the exemplary embodiment, when the pan direction is displayed, the pan direction is displayed according to the tilt angle.

Figure 8A:
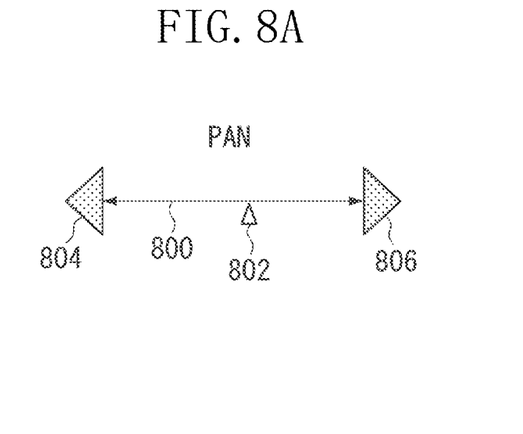
FIGS. 8A, 8B, 8C, 8D, and 8E illustrate pan and tilt setting screens displayed on the display apparatus in the client apparatus according to a second exemplary embodiment.

FIG. 8A illustrates a setting screen in a case where the tilt angle is zero degree. An arrow 800 indicates a pan direction and a movable range. A marker 802 indicates a current position of the pan drive mechanism. An operation button 804 drives the pan to the left. An operation button 806 drives the pan to the right. When the tilt angle is zero degree, the pan rotation moves in the horizontal direction, and then, the arrow 800 indicating the pan direction is linearly displayed. The operation buttons 804 and 806 are disposed at the both ends of the arrow 800 that indicates the linearly displayed pan direction.

Figure 8B:
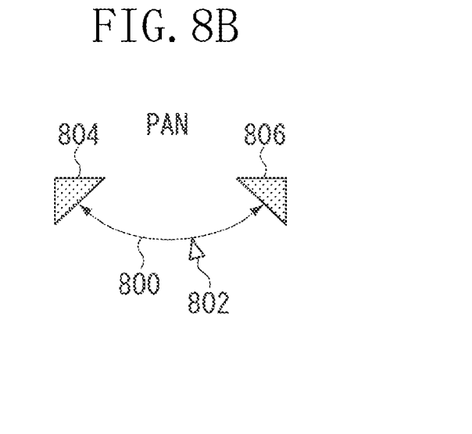
Figure 8C:
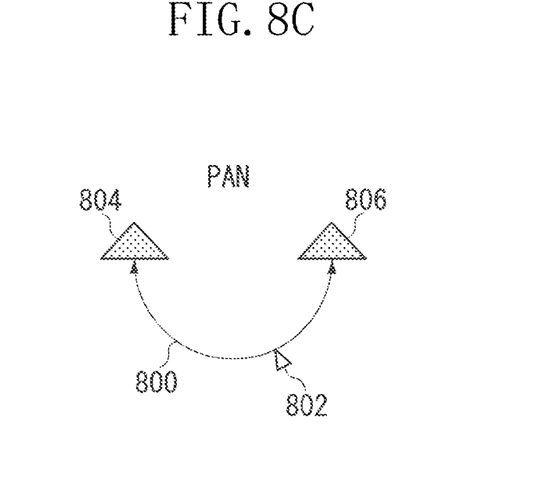
Figure 8D:
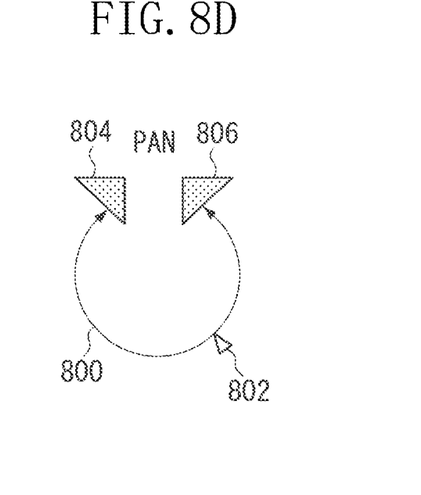

FIG. 8D illustrates a setting screen in a case where the tilt angle is 90 degrees. The pan rotation circularly moves about the optical axis, and then, the arrow 800 indicating the pan direction is displayed in the shape of an arc of a substantially circular shape.

Figure 8E:
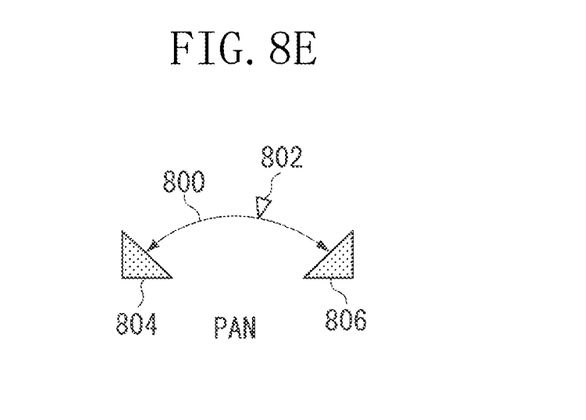

FIGS. 8B and 8C illustrate setting screens in a case where the tilt angles are between zero and 90 degrees (for example, 30 degrees and 60 degrees). When the tilt angles are 30 degrees and 60 degrees, the movement direction in the pan rotation has the shape of an arc, and then, the arrow 800 indicating the pan direction is displayed in the shape of an arc. If the movable range of the tilt drive mechanism exceeds the range of zero to 90 degrees, and can be driven to a minus side, the movable direction in the pan rotation has the shape of an arc opposite to those in FIGS. 8B to 8D. Then, the arrow 800 indicating the pan direction is displayed as illustrated in FIG. 8E.

Figure 9:
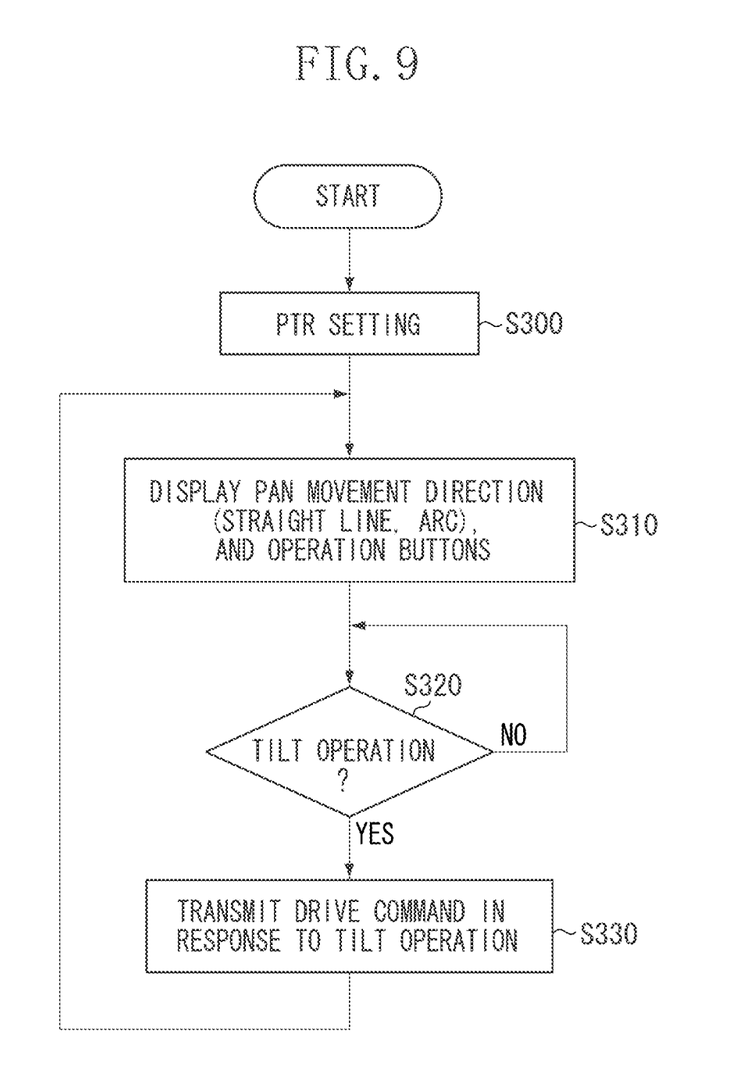
FIG. 9 is a flowchart illustrating processing to be performed by the client apparatus according to the second exemplary embodiment.

FIG. 9 is a flowchart illustrating the processing to be performed by the client apparatus 130. In a case where the functions of the client apparatus 130 are performed by the CPU 137 executing a program, the processing flow in FIG. 9 indicates the program for instructing the CPU 137 to implement the procedure illustrated in FIG. 9. The CPU 137 executes the program read from a storage unit (not shown). The storage unit is a storage medium that records the program which the CPU 137 can read. The storage medium includes, for example, a ROM. The processing flow in FIG. 9 can be implemented by hardware.

First, in step S300, the CPU 137 enters the PTR setting mode for performing setting (operation) of each mechanism of the pan, tilt, and rotation. In the PTR setting mode, the CPU 137 displays the pan, tilt, and rotation setting screens, and gives instructions to the network camera 110 by commands.

In step S310, the CPU 137 instructs the image display control unit 133 to display the pan direction (the linear-shaped or arc-shaped arrow 800), the pan position (the marker 802), and the operation buttons (804 and 806) corresponding to the current rotation angle.

In step S320, the CPU 137 checks whether tilt operation is performed. In step S320, if the tilt operation is performed (YES in step S320), in step S330, according to the tilt operation, the CPU 137 transmits a drive command to the network camera 110. Then, the processing returns to the processing in step S310, and the CPU 137 instructs the image display control unit 133 to display the pan direction, the pan position, and the operation buttons corresponding to the tilt angle.

As described above, according to the tilt angle, the pan direction is displayed in the linear shape or in the shape of the arc. Accordingly, the user can operate more easily and with a feeling of reality.

In the exemplary embodiment, on the pan and tilt setting screen, according to the tilt angle, the pan direction is clearly shown in the linear shape or in the shape of the arc along with the actual movement of the captured image. Further, together with rotation, in combination with the system for changing the pan direction according to the rotation angle described in the first exemplary embodiment, the display can be made for the user. Thus, the user can operate more easily and with a feeling of reality.

Although the useful exemplary embodiments of the present invention have been described, the present invention is not limited to the exemplary embodiments. The display configurations of the movement directions in the pan, tilt, and rotation, further, the display configurations of the current positions, the operation systems, the movable ranges, and the like are not limited to the above-described methods.

In the above-described first exemplary embodiment and the second exemplary embodiment, the pan direction, the tilt direction, and the rotation movable range, and the like are displayed at the side of the client apparatus 130, however, it is not limited to the above. For example, in the network camera 110, after the pan direction or the tilt direction is superimposed on a captured image, the data can be output to the client apparatus 130. Also in such a case, the user can operate the imaging direction of the network camera to a desired direction.

Further, the above-described first exemplary embodiment and the second exemplary embodiment can be performed at the same time. More specifically, the configuration for displaying the pan direction according to the current tilt angle and the configuration for displaying the pan direction or the tilt direction according to the current rotation angle can be simultaneously performed. In addition to the above, according to the current pan angle, the movable range in the rotation can be displayed.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-157715 filed Jul. 12, 2010, which is hereby incorporated by reference herein in its entirety.

What is claimed is:

1. An imaging control system for controlling a direction of an optical axis of an imaging unit, the imaging control system comprising:
a pan change unit configured to change the direction of the optical axis to a pan direction;
a tilt change unit configured to change the direction of the optical axis to a tilt direction; and
a display control unit configured to display a panning direction guide together with an image captured by the imaging unit on a display, the panning direction guide indicating the pan direction, wherein the display control unit is further configured to change a display of the panning direction guide in curvature corresponding to the direction of the optical axis changed by the tilt change unit.

2. The imaging control system according to claim 1, wherein the display control unit indicates the change direction to which the direction of the optical axis is changed by the pan change unit, by using an arrow in a linear shape or an arc shape.

3. The imaging control system according to claim 1, wherein the display control unit controls to display the panning direction guide by using an arrow in a linear shape or an arc shape and to display an operation button to operate the pan change unit.

4. The imaging control system according to claim 1, further comprising:
an imaging apparatus; and
a control apparatus, wherein
the imaging apparatus includes the pan change unit and the tilt change unit and is configured to output information indicating the direction of optical axis changed by the tilt change unit via a network; and
the control apparatus includes the display control unit further configured to receive the information and change the display of the panning direction guide in curvature corresponding to the direction of the optical axis based on the received information.

5. An imaging control system for controlling a direction of an optical axis of an imaging unit that rotates about the optical axis, the imaging control system comprising:
a change unit configured to change the direction of the optical axis along a pan direction or a tilt direction; and
a display control unit configured to display at least one direction guide together with an image captured by the imaging unit on a display, wherein an orientation of the direction guide changes with an amount corresponding to an amount of change of a rotation angle of the imaging unit about the optical axis.

6. The imaging control system according to claim 5, wherein the display control unit displays the direction guide on the side of the captured image or by overlapping the direction guide with the captured image.

7. The imaging control system according to claim 5, wherein the display control unit indicates the pan direction and the tilt direction by using an arrow or a bar respectively.

8. The imaging control system according to claim 5, wherein the display control unit controls to display a marker indicating a current rotation angle of the imaging unit.

9. The imaging control system according to claim 5, further comprising:
an imaging apparatus; and
a control apparatus, wherein
the imaging apparatus includes the change unit and outputs information indicating the rotation angle of the imaging unit via a network; and
the control apparatus is configured to receive the information and change the orientation of the direction guide with an amount corresponding to an amount of change of a rotation angle of the imaging unit about the optical axis based on the received information.

10. The imaging control system according to claim 5, wherein
the display control unit displays on the display, the direction guide indicating a direction along which the direction of the optical axis is changed by the change unit, and
the direction indicated by the direction guide on the display changes corresponding to an angle of rotation of the imaging unit.

11. An imaging control system for controlling a direction of an optical axis of an imaging unit that rotates about the optical axis, the imaging control system comprising:
a pan change unit configured to change the direction of the optical axis along a pan direction; and
a display control unit configured to display a range guide together with an image captured by the imaging unit on a display, the range guide indicating a range the imaging unit can rotate, wherein the range indicated by the range guide changes corresponding to the optical axis changed by the pan change unit.

12. The imaging control system according to claim 11 further comprising:
an imaging apparatus; and
a control apparatus, wherein
the imaging apparatus includes the pan change unit and outputs information indicating the direction of the optical axis changed by the pan change unit via a network; and
the control apparatus is configured to receive the information and change the range indicated by the range guide corresponding to the direction of the optical axis based on the received information.

13. A control apparatus for an imaging apparatus including a pan change unit configured to change a direction of an optical axis along a pan direction, and a tilt change unit configured to change the direction of the optical axis along a tilt direction, the control apparatus comprising:
a display control unit configured to display a panning direction guide together with an image captured by the imaging unit on a display, wherein the display control unit is further configured to change a display of the panning direction guide in curvature corresponding to the direction of the optical axis changed by the tilt change unit.

14. The control apparatus according to claim 13, wherein the display control unit controls to display the panning direction guide by using an arrow in a linear shape or an arc shape and to display an operation button to operate the pan change unit.

15. The control apparatus according to claim 13, wherein the display control unit controls to display a marker indicating a current rotation angle of the imaging unit.

16. The control apparatus according to claim 13, wherein the imaging apparatus is configured to output information indicating the direction of optical axis via a network after the tilt change unit changes the direction of the optical axis, and wherein the control apparatus is configured to receive the information via the network and the display control unit is further configured to change the display of the panning direction guide in curvature corresponding to the direction of the optical axis based on the received information.

17. A control apparatus for an imaging apparatus including an imaging unit that rotates about an optical axis, and a change unit configured to change a direction of the optical axis along a pan direction or a tilt direction, the control apparatus comprising:
   a display control unit configured to display at least one direction guide together with an image captured by the imaging unit on a display, wherein an orientation of the direction guide changes with an amount corresponding to an amount of change of angle rotation of the imaging unit about the optical axis.

18. The control apparatus according to claim 17, wherein the imaging apparatus is configured to output information indicating the direction of the optical axis via a network after rotation of the imaging unit is performed, and wherein the control apparatus is configured to receive the information via the network, and the at least one direction guide is configured to change the orientation with an amount corresponding to an amount of change of rotation angle of the imaging unit about the optical axis based on the received information.

19. The imaging control apparatus according to claim 17, wherein
   the display control unit displays on the display, the direction guide indicating a direction along which the direction of the optical axis is changed by the change unit, and
   wherein the direction indicated by the direction guide on the display changes corresponding to an angle of rotation of the imaging unit.

20. A control apparatus for an imaging apparatus including an imaging unit that rotates about an optical axis, and a pan change unit configured to change the direction of the optical axis along a pan direction, the control apparatus comprising:
   a display control unit configured to display a range guide together with an image captured by the imaging unit on a display, the range guide indicating a range the imaging unit can rotate, wherein the range indicated by the range guide changes corresponding to the optical axis direction changed by the pan change unit.

21. The control apparatus according to claim 20, wherein the display control unit controls to display a marker indicating a current rotation angle of the imaging unit.

22. The control apparatus according to claim 20, wherein the imaging apparatus is further configured to output information indicating the direction of the optical axis via a network after the pan change unit changes the direction of the optical axis, and wherein the control apparatus is configured to receive the information via the network, and the range indicated by the range guide on the display changes corresponding to the optical axis direction changed by the pan change unit based on the received information.

23. A control method for an imaging apparatus including a pan change unit configured to change a direction of an optical axis along a pan direction, and a tilt change unit configured to change the direction of the optical axis along a tilt direction, the control method comprising:
   displaying a panning direction guide together with an image captured by the imaging unit on a display, the panning direction guide indicating the pan direction, and changing a display of the panning direction in curvature corresponding to the direction of the optical axis changed by the tilt change unit.

24. The control method according to claim 23, further comprising:
   outputting from the imaging apparatus information indicating the direction of the optical axis changed by the tilt change unit via a network;
   receiving the information; and
   changing the display of the panning direction guide in curvature corresponding to the direction of the optical axis based on the received information.

25. A control method for an imaging apparatus including an imaging unit that rotates about an optical axis, and a change unit configured to change a direction of the optical axis along a pan direction or a tilt direction, the control method comprising:
   displaying at least one direction guide together with an image captured by the imaging unit on a display, wherein an orientation of the direction guide changes with an amount corresponding to an amount of change of rotation angle of the imaging unit about the optical axis.

26. The control method according to claim 25, further comprising:
   outputting from the imaging apparatus information indicating the direction of the optical axis via a network after rotation of the imaging unit is performed;
   receiving the information; and
   changing the orientation with the amount corresponding to the amount of change of the rotation angle about the optical axis based on the received information.

27. The control method according to claim 25, wherein
   displaying on the display, the direction guide indicating a direction along which the direction of the optical axis is changed by the change unit, and
   the direction indicated by the direction guide on the display changes corresponding to an angle of rotation of the imaging unit.

28. A control method for an imaging apparatus including an imaging unit that rotates about an optical axis, and a pan change unit configured to change a direction of the optical axis along a pan direction, the control method comprising:
   displaying a range guide together with an image captured by the imaging unit on a display, the range guide indicating a range the imaging unit can rotate, and changing the range indicated by the range guide corresponding to the optical axis direction changed by the pan direction guide.

29. The control method according to claim 28, further comprising:
   receiving from the imaging apparatus information indicating the direction of the optical axis via a network after the pan change unit changes the direction of the optical axis;
   receiving the information; and
   changing the range indicated by the range guide corresponding to the direction of the optical axis based on the received information.

30. A non-transitory computer-readable storage medium storing a program for instructing an imaging apparatus including a pan change unit configured to change a direction of an optical axis along a pan direction, and a tilt change unit configured to change the direction of the optical axis along a tilt direction, to execute a display control procedure for displaying a panning direction guide together with an image captured by the imaging unit on a display, the panning direction guide indicating the pan direction, wherein the display control procedure changes a display of the panning direction guide in curvature corresponding to the direction of the optical axis changed by the tilt change unit.

31. The non-transitory medium according to claim 30, wherein the medium stores a program for instructing the imaging apparatus to display the panning direction guide, by using an arrow in a linear shape or an arc shape and to display an operation button to operate the pan change unit.

32. The non-transitory medium according to claim 30, wherein the medium stores a program for instructing the imaging apparatus to display a marker indicating a current rotation angle of the imaging unit.

33. The non-transitory computer-readable storage medium according to claim 30, wherein the program further instructs to:
 outputting from the imaging apparatus information indicating the direction of the optical axis changed by the tilt change unit via a network;
 receiving the information; and
 changing the display of the panning direction guide in curvature corresponding to the direction of the optical axis based on the received information.

34. A non-transitory computer-readable storage medium storing a program for instructing an imaging apparatus including an imaging unit that rotates about an optical axis, and a change unit configured to change a direction of the optical axis along a pan direction or a tilt direction, to execute a display control procedure for displaying at least one direction guide together with an image captured by the imaging unit on a display, wherein an orientation of the direction guide changes with an amount corresponding to an amount of change of rotation angle of the imaging unit about the optical axis.

35. The non-transitory computer-readable storage medium according to claim 34, wherein the program further instructs to:
 outputting from the imaging apparatus information indicating the direction of the optical axis via a network after rotation of the imaging unit is performed;
 receiving the information; and
 changing the orientation with the amount corresponding to the amount of change of the rotation angle about the optical axis based on the received information.

36. The non-transitory computer-readable storage medium according to claim 34, wherein the program further instructing to
 display on the display, the direction guide indicating a direction along which the direction of the optical axis is changed by the change unit, and
 the direction indicated by the direction guide on the display changes corresponding to an angle of rotation of the imaging unit.

37. A non-transitory computer-readable storage medium storing a program for instructing an imaging apparatus including an imaging unit that rotates about an optical axis, and a pan change unit configured to change the direction of the optical axis along a pan direction, to execute a display control procedure for displaying a range guide together with an image captured by the imaging unit on a display, the range indicated by the range guide changes corresponding to the optical axis direction changed by the pan change unit.

38. The non-transitory medium according to claim 37, wherein the medium stores a program for instructing the imaging apparatus to display a marker indicating a current rotation angle of the imaging unit.

39. The non-transitory computer-readable storage medium according to claim 37, wherein the program further instructs to:
 outputting from the imaging apparatus information indicating the direction of the optical axis via a network after the pan change unit changes the direction of the optical axis;
 receiving the information; and
 changing the range indicated by the range guide corresponding to the direction of the optical axis based on the received information.

40. An imaging control system for controlling a direction of an optical axis of an imaging unit, the imaging control system comprising:
 a pan change unit configured to change the direction of the optical axis along a pan direction;
 a tilt change unit configured to change the direction of the optical axis along a tilt direction; and
 a display control unit configured to display a panning direction guide together with an image captured by the imaging unit on a display, wherein the display control unit is further configured to change a display of the panning direction guide corresponding to the direction of the optical axis changed by the tilt change unit.

41. The imaging control system of claim 40, wherein the display control unit is further configured to change a display of the panning direction guide to indicate a change of a captured image area when the direction of the optical axis is changed along the pan direction by the pan change unit corresponding to the direction of the optical axis changed by the tilt change unit.

42. A camera having an imaging unit and communicating with a control apparatus, the control apparatus controlling a direction of an optical axis of the imaging unit, and the camera comprising:
 a pan change unit configured to change a direction of an optical axis of the camera along a pan direction;
 a tilt change unit configured to change the direction of the optical axis along a tilt direction; and
 a communication unit configured to output information indicating the direction of the optical axis changed by the tilt change unit via a network;
 wherein the communication unit is further configured to output the information so that the control apparatus receives the information and changes the display of the panning direction guide in curvature corresponding to the direction of the optical axis based on the received information.

43. A camera having an imaging unit and communicating with a control apparatus, the control apparatus controlling a direction of an optical axis of the imaging unit, and the camera comprising:
 a change unit configured to change the direction of an optical axis of the camera along a pan direction or a tilt direction; and
 a communication unit configured to output information indicating a rotation angle of the imaging unit via a network;
 wherein the communication unit is further configured to output the information so that the control apparatus receives the information and change a orientation of a pan or tilt direction guide with an amount corresponding to an amount of change of a rotation angle of the imaging unit about the optical axis based on the received information.

44. A camera having an imaging unit and communicating with a control apparatus, the control apparatus controlling a direction of an optical axis of the imaging unit, and the camera comprising:
- a pan change unit configured to change the direction of the optical axis of the camera along a pan direction; and
- a communication unit configured to output information indicating the direction of the optical axis changed by the pan change unit via a network;
- wherein the communication unit is configured to output the information so that the control apparatus receives the information and changes a range indicated by a range guide corresponding to the direction of the optical axis changed by the pan change unit based on the received information.

45. A camera having an imaging unit and communicating with a control apparatus, the control apparatus controlling a direction of an optical axis of the imaging unit, and the camera comprising:
- a pan change unit configured to change the direction of the optical axis along a pan direction;
- a tilt change unit configured to change the direction of the optical axis along a tilt direction; and
- a communication unit configured to output information indicating the direction of the optical axis changed by the tilt change unit via a network;
- wherein the communication unit is further configure to output the information so that the control apparatus receives the information and changes a display of the panning direction guide corresponding to the direction of the optical axis based on the received information.

* * * * *